US006651491B2

(12) United States Patent
Saito et al.

(10) Patent No.: US 6,651,491 B2
(45) Date of Patent: Nov. 25, 2003

(54) FAILURE DIAGNOSTIC SYSTEM OF EVAPORATED FUEL PROCESSING SYSTEM

(75) Inventors: Kenji Saito, Okazaki (JP); Satoshi Nagashima, Okazaki (JP); Yoichiro Ando, Seto (JP); Hidetsugu Kanao, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/153,793

(22) Filed: May 24, 2002

(65) Prior Publication Data

US 2002/0189328 A1 Dec. 19, 2002

(30) Foreign Application Priority Data

May 25, 2001 (JP) ....................................... 2001-156812

(51) Int. Cl.[7] ............................. G01L 3/26; G01L 5/13; G01M 15/00

(52) U.S. Cl. ....................................... 73/117.3; 73/49.2

(58) Field of Search ............................... 73/118.1, 49.2; 123/520, 518, 516, 179.17, 527, 295; 220/746

(56) References Cited

U.S. PATENT DOCUMENTS 5,269,277 A * 12/1993 Kuroda et al. .............. 123/518
5,297,527 A * 3/1994 Suzuki et al. ............... 123/520
5,878,728 A * 3/1999 Kidokoro et al. ........... 123/520
6,357,288 B1 * 3/2002 Shigihama et al. ........ 73/118.1
6,523,398 B1 * 2/2003 Hanai et al. ............... 73/118.1

FOREIGN PATENT DOCUMENTS

JP 2000-282972 A 10/2000

* cited by examiner

*Primary Examiner*—Edward Lefkowitz
*Assistant Examiner*—Octavia Davis
(74) *Attorney, Agent, or Firm*—Birch, Stewart, Kolasch & Birch, LLP

(57) ABSTRACT

There is provided a failure diagnostic system of an evaporated fuel processing system, which comprises a first failure diagnostic device that shuts off an evaporated fuel purge passage connecting a fuel tank and an engine intake passage from the air and determines whether there is any leakage from a large hole by monitoring the degree of increase in pressure in the fuel tank in which engine intake negative pressure is introduced; and a second failure diagnostic device that reduces a pressure the fuel tank to a predetermined negative pressure and seals off the fuel tank from the air to carry out failure diagnosis as to whether there is any leakage from a small hole by monitoring the degree of increase in pressure in the fuel tank. An operating range of the second failure diagnostic device is set to substantially include an operating range of the first failure diagnostic device and to be extended from the operating range of the first failure diagnostic device to include a lower intake negative pressure range.

7 Claims, 6 Drawing Sheets

FAILURE DIAGNOSTIC SYSTEM OF EVAPORATED FUEL PROCESSING SYSTEM

This non-provisional application claims priority under 35 U.S.C. §119(a) on patent application Ser. No. 2001-156812 filed in Japan on May 25, 2001, which is herein incorporated by reference.

BACKGROUND OF THE INVENTION

1. Field of the Invention

The present invention relates to a failure diagnostic system that determines whether an evaporated fuel processing system has failed or not in order to prevent evaporated fuel in a fuel tank from being emitted into the air.

2. Description of Related Art

Japanese Laid-Open Patent Publication (Kokai) No. 2000-282972 discloses a failure diagnostic system that determines whether an evaporated fuel processing system has failed or not. This failure diagnostic system is comprised of a first failure diagnostic device (mode C) that determines whether there is any leakage from a large hole with a diameter of about 0.5 cm in a predetermined range based on the engine speed and the engine load as parameters, and a second failure diagnostic system (mode B) that determines that there is leakage from a small hole with a diameter of about 0.02 inch on condition that there is a small change in throttle angle in the predetermined range.

The conventional failure diagnostic system detects a failure caused by leakage from a large hole on condition that the internal pressure of the fuel tank is not reduced to a desired negative pressure. More specifically, the conventional failure diagnostic system determines that the internal pressure of the fuel tank is not reduced to a desired negative pressure, i.e. there is a failure caused by leakage from a large hole on condition that the internal pressure of a tank does not become lower than a predetermined value within a predetermined period of time. In this method, the intake negative pressure that enables a predetermined pressure reduction within a predetermined period of time is normally required, and therefore, the predetermined range of the diagnosis as to whether there is any leakage from a large hole is necessarily determined to be an engine operating range that achieves a certain intake negative pressure. In determining whether there is any leakage from a small hole, the degree of increase in pressure in a sealed fuel tank with the internal pressure thereof having been reduced to a predetermined negative pressure is detected to carry out failure diagnosis, unlike diagnosis as to whether there is any leakage from a large hole as described above. However, the range of the diagnosis as to whether there is any leakage from a small hole is identical with the predetermined range of the diagnosis as to whether there is any leakage from a large hole.

Whether there is any leakage from a small hole is determined according to the degree of increase in the pressure after the pressure reduction, the range of the diagnosis should not necessarily be a range that achieves an intake negative pressure that enables the predetermined pressure reduction in the predetermined period of time. Whether there is any leakage from a small hole may be determined in a longer period of time than the predetermined period of time insofar as the predetermined pressure reduction can be achieved. In the conventional failure diagnostic system, however, this is not taken into consideration in setting the ranges of the diagnosis. Specifically, the range of the diagnosis as to whether there is any leakage from a small hole is only set to be identical with the range of the diagnosis as to whether there is any leakage from a large hole. This unnecessarily limits the range of the diagnosis as to whether there is any leakage from a small hole, and therefore reduces failure diagnosis opportunities.

Further, the conventional failure diagnostic system sets another diagnostic device (mode A) that determines whether there is any leakage from a small hole in air-fuel ratio leaning control during idling with an engine speed being equal to or higher than a predetermined value. This only increases the opportunities for detecting leakage from a small hole by addition of another device and makes the control logic and the like complicated, but cannot efficiently increase failure diagnosis opportunities.

SUMMARY OF THE INVENTION

It is therefore an object of the present invention to provide a failure diagnostic system that determines whether an evaporated fuel processing system has failed or not, and that enables an improvement in the failure diagnostic performance by increasing failure diagnosis opportunities without any trouble.

To attain the above object, the present invention provides a failure diagnostic system of an evaporated fuel processing system, comprising: a first failure diagnostic device for shutting off an evaporated fuel purge passage connecting a fuel tank and an engine intake passage from air and determining whether there is any leakage from a large hole by monitoring a degree of increase in pressure in the fuel tank with internal pressure thereof having been reduced to a negative pressure; and a second failure diagnostic device for a pressure in the fuel tank to a predetermined negative pressure and sealing off the fuel tank from air to carry out failure diagnosis to determine whether there is any leakage from a small hole by monitoring a degree of increase in pressure in the fuel tank; and wherein an operating range of the second failure diagnostic device is set to substantially include an operating range of the first failure diagnostic device and to be extended from the operating range of the first failure diagnostic device to include a lower intake negative pressure range.

According to the present invention, the first failure diagnostic device determines whether there is any leakage from a large hole shuts off the purge passage for evaporated fuel, which connects the fuel tank to the engine intake passage, from the air and introduces in the engine intake negative pressure into the fuel tank, and detects poor introduction of the engine intake negative pressure by monitoring the degree of decrease in the internal pressure of the fuel tank. Therefore, the operating range of the first failure diagnostic device is necessarily determined according to the engine intake negative pressure. The second failure diagnostic device that determines whether there is any leakage from a small hole reduces the internal pressure of the fuel tank to the predetermined negative pressure and seals off the fuel tank from air to carry out failure diagnosis to determine whether there is any leakage from a small hole by monitoring the degree of increase in the internal pressure of the fuel tank. Therefore, even if a change in the pressure is small when the negative pressure is introduced, the second failure diagnostic device is capable of failure diagnosis insofar as the pressure can be reduced to the predetermined negative pressure. Therefore, the present invention in which the operating range of the second failure diagnostic device is set to substantially include an operating range of the first failure diagnostic device and to be extended from the operating range of the first failure diagnostic device to include a lower intake negative pressure range makes use of differences in characteristics between the first failure diagnostic device and the second failure diagnostic device, increases the opportunities for failure diagnosis by the second failure diagnostic device without any trouble, and improves the failure diagnostic performance.

In one preferred form of the present invention, the respective operating ranges of the first failure diagnostic device and the second failure diagnostic device are determined according to the engine speed and the engine load determined as parameters, such that the operating range of the second failure diagnostic device includes a lower engine speed range and a lower engine speed range than the operating range of the first failure diagnostic device. It is therefore possible to simply set the optimum operating ranges of the first and second failure diagnostic devices.

In another preferred form of the present invention, the operating range B includes the entire operating range A, it is not only determined whether there is any leakage from a large hole. Therefore, it is never determined that the evaporated fuel purge system is normally operating even though there is leakage from a small hole, and this ensures the reliability of the failure diagnosis.

BRIEF DESCRIPTION OF DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Figure 1:
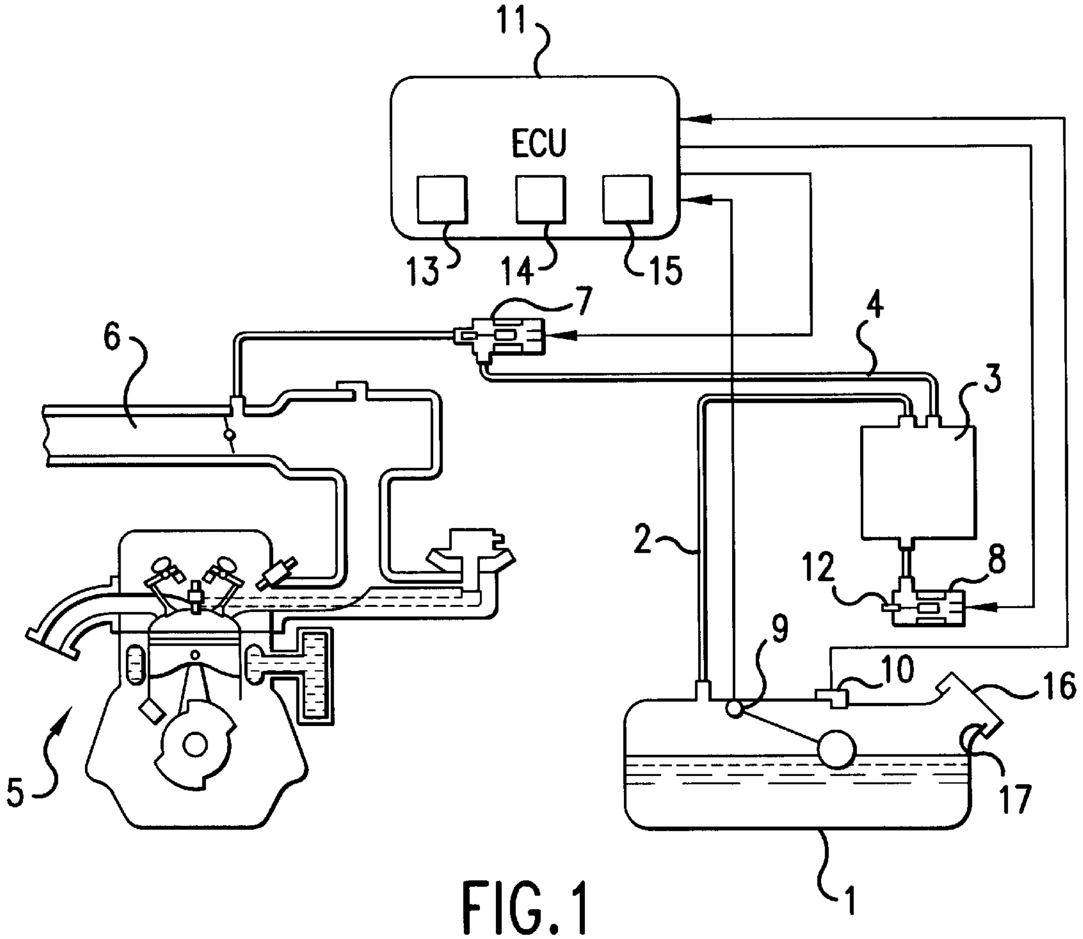
FIG. 1 is a schematic diagram showing the construction of an evaporated fuel processing system and a failure diagnostic system according to an embodiment of the present invention.

A preferred embodiment of the present invention will now be described in detail with reference to the accompanying drawings. An evaporated fuel purge system as an evaporated fuel processing system according to the present embodiment is intended to prevent evaporated fuel (vapor) in a fuel tank 1 installed in a vehicle, such as a motor vehicle, from being emitted into the air. This failure diagnostic system is constructed such that the evaporated fuel from the fuel tank 1 is led into a canister 3, which is connected to a vapor passage 2, through the vapor passage 2, and the evaporated fuel having been absorbed to the of the canister 3 is purged into an intake passage 6 of an internal combustion engine 5 through a purge passage 4 on predetermined conditions.

A purge solenoid vale 7 serving as an opening and closing device for opening and closing the purge passage 4 is provided in the purge passage 4. A vent solenoid valve 8 for opening and closing an air port 12 is mounted on the canister 3. The purge solenoid valve 7 and the vent solenoid valve 8 are used for failure diagnosis. The purge solenoid valve 7 and the vent solenoid valve 8 are connected to an engine control unit (hereinafter referred to as "ECU") 11 and are controlled to open and close according to control signals supplied from the ECU 11.

Figure 6:
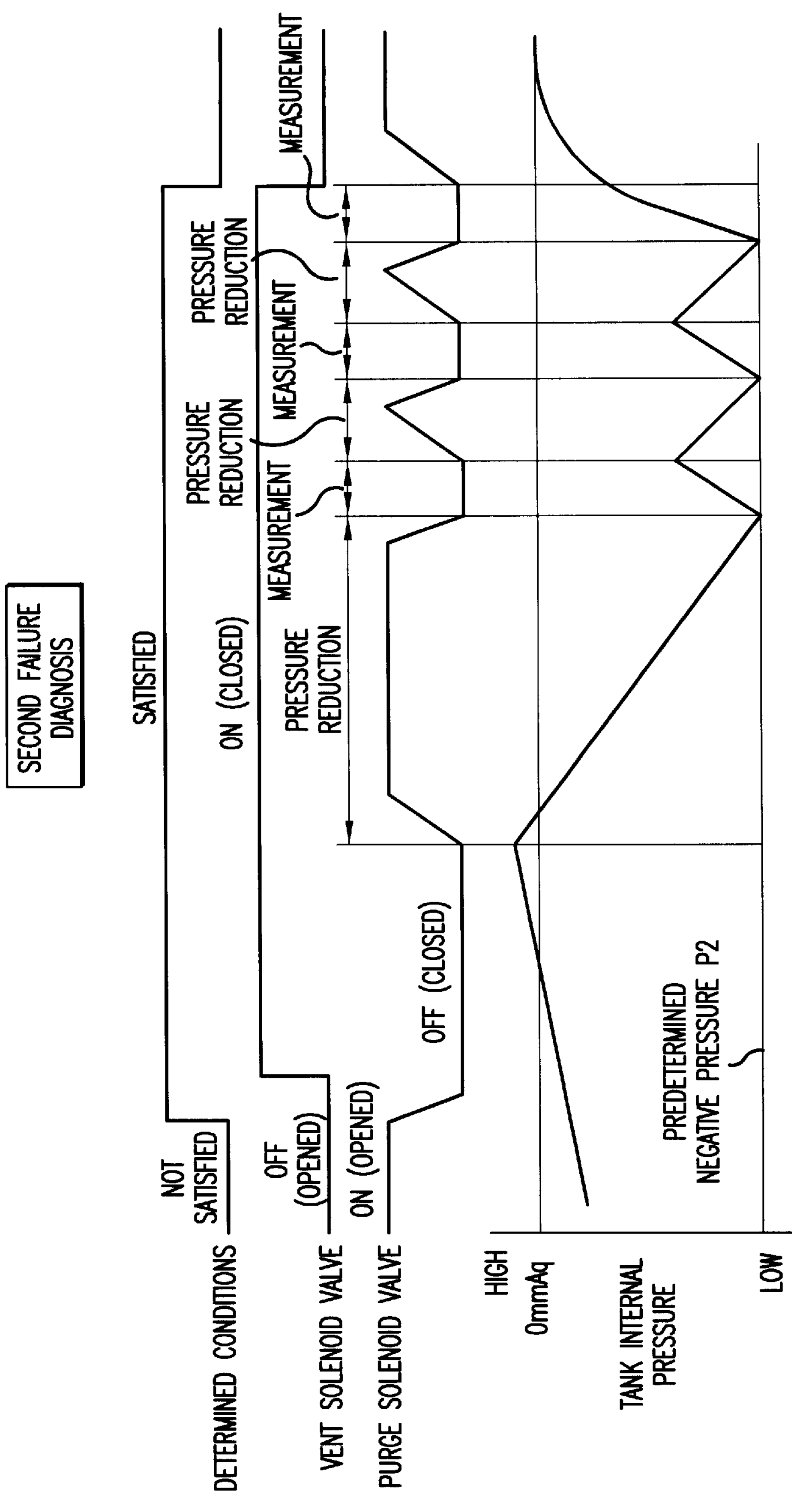
FIG. 6 is a time chart useful in explaining the second failure diagnosis.
Figure 7:
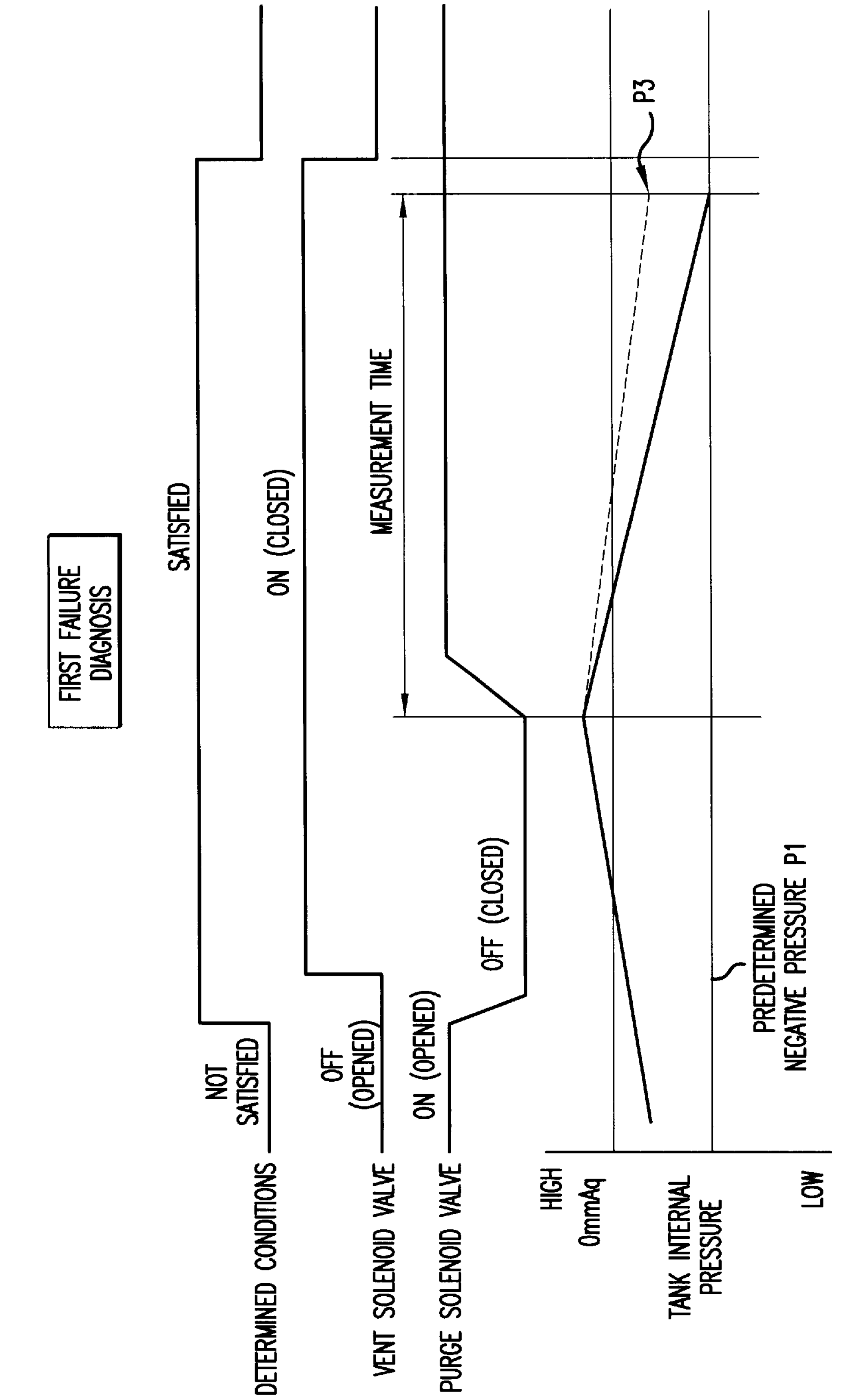
FIG. 7 is a time chart useful in explaining the first failure diagnosis.

As shown in FIGS. 6 and 7, when turned on, the purge solenoid valve 7 is opened to open the purge passage 4, and when turned off, it closes the purge passage 4. The vent solenoid valve 8 opens the air port 12 when turned off, and closes the air port 12 when turned on. Normally, the purge solenoid valve 7 is ON and the vent solenoid valve 8 is OFF in the evaporated fuel purge system. If the determination conditions for failure diagnosis have been determined, the purge solenoid valve 7 is turned off to close the purge passage 4, and the vent solenoid valve 8 is turned on to close the air port 12 to increase the internal pressure of the fuel tank 1 to a pressure approximate to an atmospheric pressure. In this state, if the purge solenoid valve 7 is turned on to open the purge passage 4, the fuel tank 1 and the intake passage 6 are brought into communication with each other via the vapor passage 2 and the purge passage 4 so that the inside pressure of the fuel tank 1 can be reduced by the vacuuming action in the intake passage 6.

A fuel level sensor 9 as a remained fuel quantity detecting device is attached to the fuel tank 1 so as to detect the quantity of remained fuel in the fuel tank 1. A pressure sensor serving as a pressure detecting device as a condition detecting device is attached to the fuel tank 1 so as to detect the internal pressure of the fuel tank 1. Detection information supplied from the fuel level sensor 9 and the pressure sensor 10 is transmitted to the ECU 11. A detachable filler cap 16 is mounted on an oil filler 17 of the fuel tank 1. In the case where the filler cap 16 is normally mounted on the oil filler 17, the filler cap 16 seals the oil filler 17 to prevent the air from being led into the fuel tank 1 through the oil filler 17 (first embodiment).

The evaporated fuel purge system that is constructed in the above-mentioned manner includes a failure diagnostic system that detects a failure caused by leakage in the evaporated fuel purge system in order to prevent evaporated fuel from being emitted into the air due to failure. By controlling the purge solenoid valve 7 and the vent solenoid valve 8, the failure diagnostic system carries out failure diagnosis by monitoring the degree of decrease (ΔPD) and the degree of increase (ΔP) in the internal pressure of the fuel tank 1.

The failure diagnostic system has a first failure diagnostic device 13 that controls the purge solenoid valve 7 and the vent solenoid valve 8 to shut off the purge passage 4 from the air, takes in engine intake negative pressure into the purge passage 4 and then carries out failure diagnosis by determining whether there is any leakage from a large hole by monitoring the degree of decrease (ΔPD) in the internal pressure of the fuel tank 1; a second failure diagnostic device 14 that controls the purge solenoid valve 7 and the vent solenoid valve 8 to decrease the internal pressure of the fuel tank 1 to a predetermined negative pressure and then shut off the purge passage 4 from the air and carries out failure diagnosis by determining whether there is any leakage from a small hole by monitoring the degree of increase (ΔPD) in the internal pressure of the fuel tank 1; and a selection device 15 that selects the first failure diagnostic device 13 or the second failure diagnostic device. In this embodiment, the ECU 11 includes the first failure diagnostic device 13, second failure diagnostic device 14, and selecting device 15.

Figure 2:
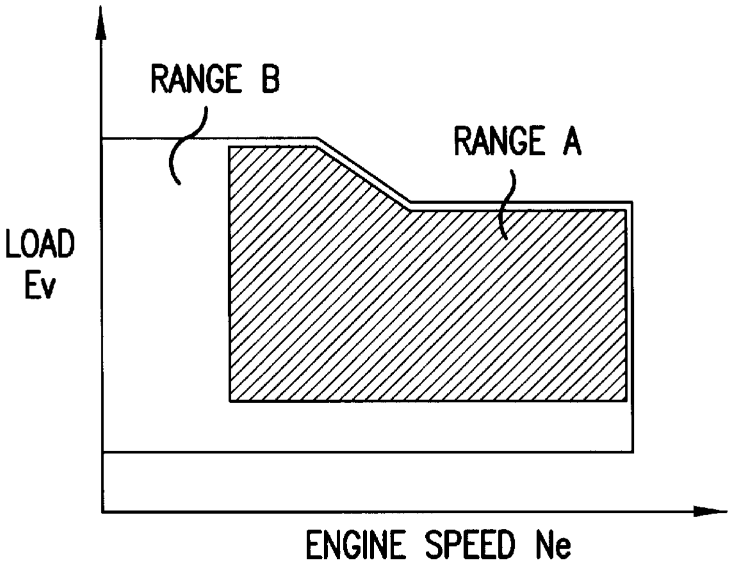
FIG. 2 is a diagram showing respective operating ranges of a first failure diagnostic device and a failure diagnostic device.

FIG. 2 is a diagram showing an operating range A of the operation of the first failure diagnostic device 13, and an operating range B of the operation of the first failure diagnostic device 14. In FIG. 2, the vertical axis represents a load Ev of an engine or the like, and the horizontal axis represents an engine speed Ne. In this embodiment, the operating range B substantially includes the operating range A, and is extended from the operating range A to include a lower intake negative pressure range. Namely, the engine speed Ne and the load Ev are set as parameters of the operating ranges A and B, and the operating range B includes the lower load range and/or the lower engine speed range than the operating range A and includes the entire operating range A.

In this embodiment, the failure diagnosis as to whether there is any leakage from a small hole device that it is determined whether or not there is any leakage from a hole with a diameter of about 1.0 mm, and the failure diagnosis as to whether there is any leakage from a large hole device that it is determined whether or not there is any leakage from a large hole with a diameter of not less than 1.0 mm or the filler cap 16 is closed or not. A memory, not shown, of the ECU 11 stores in advance a leakage determination value M for use in failure diagnosis by the first failure diagnostic device 13 and a leakage determination value L for use in failure diagnosis by the second failure diagnostic device 14.

A description will now be given of the operations of the first failure diagnostic device 13, second failure diagnostic device 14, and selection device 15 with reference to flow charts of FIGS. 3, 4, and 5.

Figure 3:
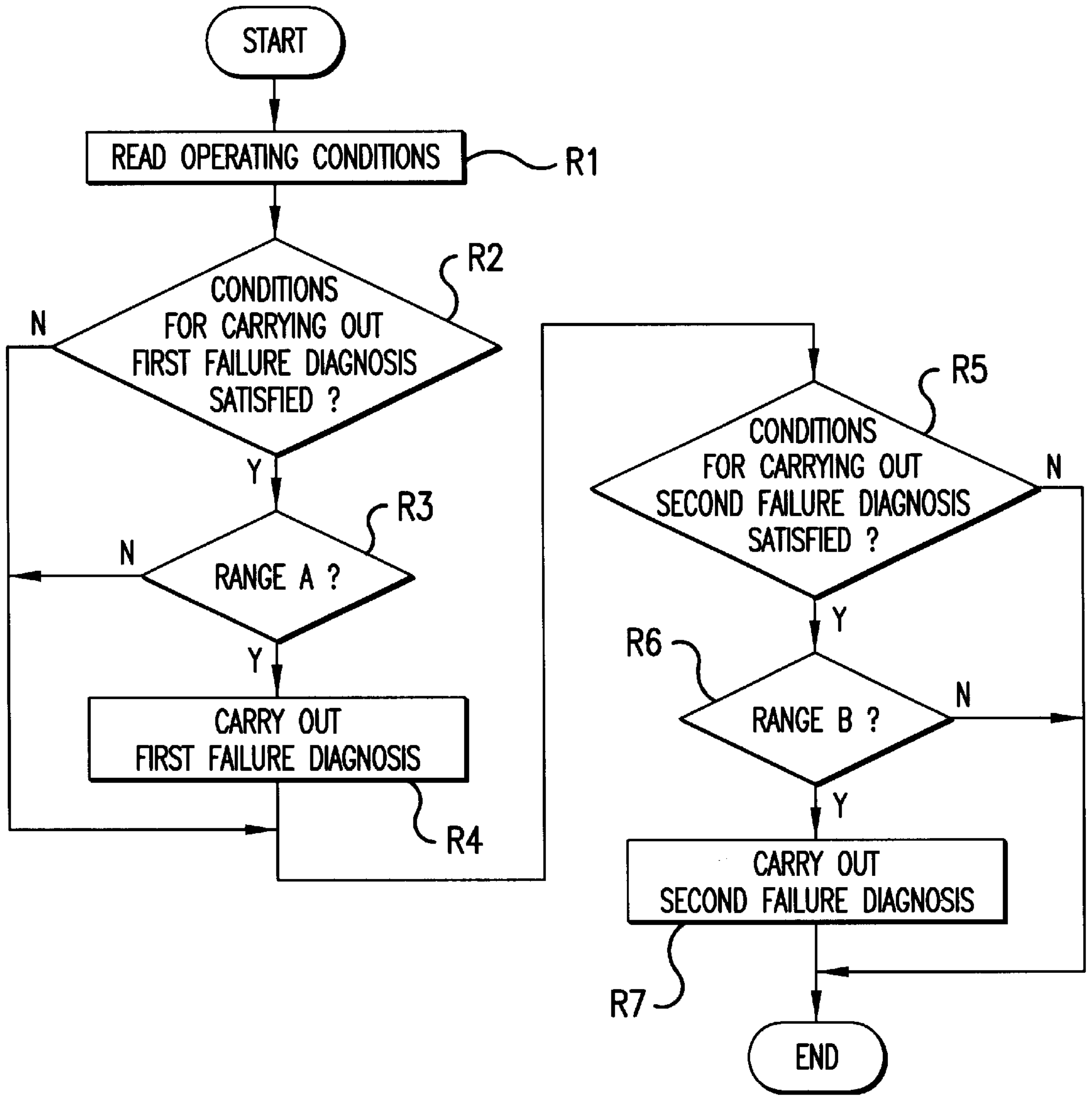
FIG. 3 is a flow chart showing the procedure for selecting the first or second failure diagnostic device.

In FIG. 3, detecting devices, not shown, such as a revolutionary speed sensor and a throttle angle sensor, detect and read the engine speed Ne and the engine load Ev in a step R1, and also read operating conditions such as the water temperature, intake temperature, learned air-fuel ratio, and remained fuel quantity. It is determined in a step R2 whether or not the operating conditions except for the engine speed Ne and the engine load Ev satisfy predetermined conditions for carrying out a first failure diagnosis. If the predetermined conditions are satisfied, the process proceeds to a step R3 to determine whether the engine speed Ne and the engine load Ev are included in the operating range A or not with reference to the map of FIG. 2. If the engine speed Ne and the engine load Ev are included in the operating range A, the process proceeds to a step R4 to select the first failure diagnostic device 13 to carry out a first failure diagnosis described later.

After the first failure diagnosis in the step R4 is finished, or if it is determined in the step R2 that the predetermined conditions for carrying out the first failure diagnosis are not satisfied, or if it is determined in the step R3 that the engine speed Ne and the engine load Ev are not included in the operating range A, the process proceeds to a step R5. In the step R5, it is determined whether or not the operating conditions except for the engine speed Ne and the engine load Ev satisfy predetermined conditions for carrying out a second failure diagnosis. If it is determined in the step R5 that the predetermined conditions are satisfied, it is then determined in a step R6 whether or not the engine speed Ne and the engine load Ev are included in the operating range B with reference to the map of FIG. 2. If the engine speed Ne and the engine load Ev are included in the operating range B, the process proceeds to a step R7 wherein the second failure diagnostic device 14 is selected to carry out the second failure diagnosis described later. It should be noted that after the second failure diagnosis in the step R7 is finished, or if it is determined in the step R5 that the predetermined conditions are not satisfied, or if it is determined in the step R6 that the engine speed Ne and the engine load Ev are not included in the operating range B, the process is terminated.

Figure 4:
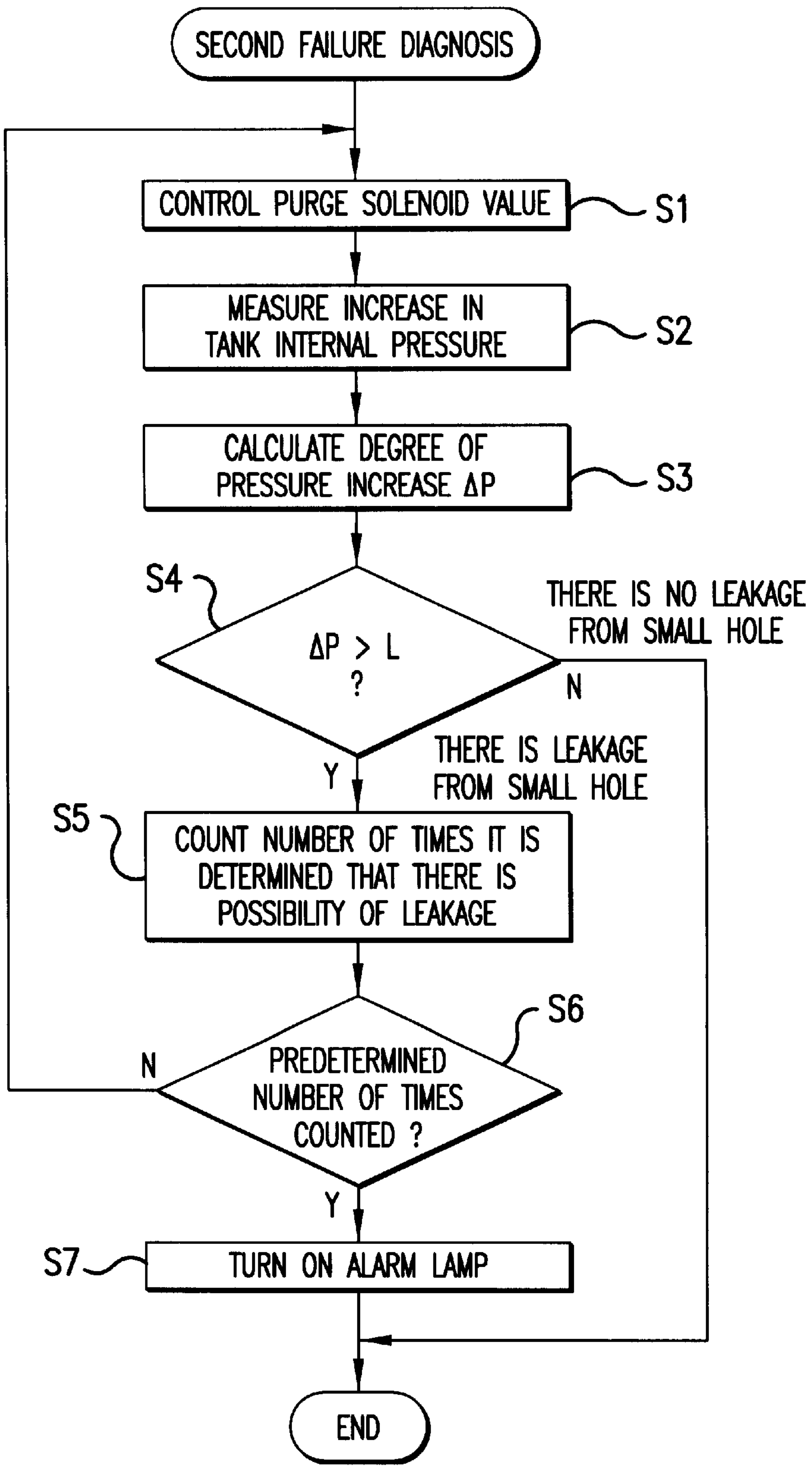
FIG. 4 is a flow chart showing one form of a second failure diagnosis according to an embodiment.

FIG. 4 illustrates the details of the operation carried out by the second failure diagnostic device 14 in the step R7 of FIG. 3. The second failure diagnostic device 14 turns on the purge solenoid valve 7 in a step S1 to decrease the internal pressure of the fuel tank 1 to a predetermined negative pressure P2 shown in FIG. 6, and then turns off the purge solenoid valve 7 to seal the fuel tank 1. The process then proceeds to a step S2 wherein an increase in the internal pressure of the fuel tank 1 is measured (refer to FIG. 6), and in a step S3, the degree of increase ΔP in the internal pressure (an increase from the predetermined negative pressure P2) is calculated from the measurement result). In the step S4, the degree of increase ΔP in the internal pressure is compared with the leakage determination value L, and if the degree of increase ΔP is equal to or smaller than the leakage determination value L, it is determined that there is no leakage in the evaporated fuel purge system. The vent solenoid valve 8 is then turned off to end the second failure diagnosis.

If it is determined in the step S4 that the degree of increase ΔP is greater than the leakage determination value L, it is determined that there is the possibility of leakage in the evaporated fuel purge system. The process then proceeds to a step S5 wherein the number of times it is determined that there is the possibility of leakage is counted, and it is then determined in a step S6 whether or not the counted number of times has reached a predetermined number of times stored in advance in the memory of the ECU 11. If the counted number of times has not reached the predetermined number of times, the steps S1 to S6 are repeated in order to improve the reliability. If the number of times the degree of increase ΔP becomes greater than the leakage predetermination value L exceeds a predetermined number of times such as twice, the process proceeds to a step S7 based on the determination that there is leakage in the fuel system. In the step S7, an alarm lamp, not shown, is turned on to warn that the evaporated fuel purge system has failed, and the belt solenoid valve 8 is turned off to complete the second failure diagnosis.

Figure 5:
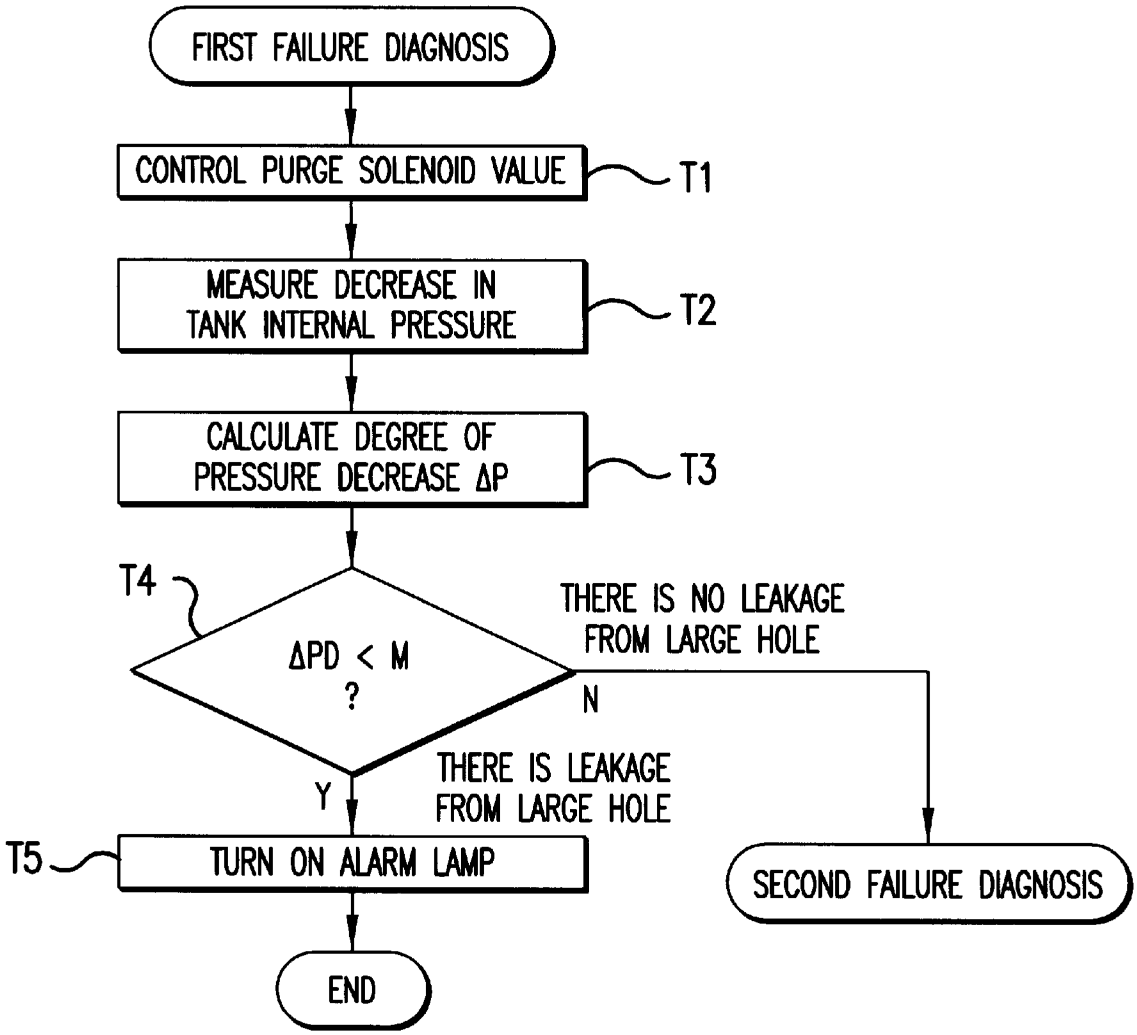
FIG. 5 is a flow chart showing one form of a first failure diagnosis.

FIG. 5 illustrates the details of the operations carried out by the first failure diagnostic device 13 in the step R4 of FIG. 3. In the first failure diagnosis, the purge solenoid valve 7 is turned on in a step T1, and the process then proceeds to a step T2. In the step T2, a decrease in the internal pressure of the fuel tank 1 is measured for a predetermined period of time. In a step T3, the degree of decrease ΔPD is calculated from the measurement result. On this occasion, the degree of decrease ΔPD in the internal pressure of the fuel tank 1 for the predetermined period of time after the turning-on of the purge solenoid valve 7 is calculated. In a step T4, the degree of decrease ΔPD is compared with the leakage determination value M.

As indicated by a broken line in FIG. 7, if the internal pressure P3 of the fuel tank 1 is higher than the predetermined negative pressure P1 (i.e., ΔPD=M), and if the degree of decrease ΔPD in the pressure is not smaller than the reference degree of decrease in the pressure as the determination value M, the process proceeds to a step T5 based on the determination that there is a large hole in the evaporated fuel purge system. In the step T5, an alarm lamp, not shown, is turned on to warn that the evaporated fuel purge system has failed, and the process then proceeds to a step T6 wherein the vent solenoid valve 8 is turned off to end the first failure diagnosis. If it is determined in the step T4 that the degree of decrease ΔPD in the pressure is greater than the leakage determination value M, it is determined that there is no large hole in the evaporated fuel purge system, and the operation from the step R5 downward is executed to carry out the second failure diagnosis as to leakage from a small hole.

As described above, in determining whether the evaporated fuel purge system has failed or not, the operating range B of the second failure diagnostic device 14 substantially includes the operating range A of the first failure diagnostic device 13 and is extended from the operating range A to include a lower intake negative pressure range. This increases the opportunities for failure diagnosis by the second failure diagnostic device 14 by making use of the differences in characteristics between the first failure diagnostic device 13 and the second failure diagnostic device 14, and enables an improvement in the failure diagnostic performance.

Taking electric noises, accuracy errors, and the like into consideration, the second failure diagnostic device 14 that determines whether there is any leakage from a smaller hole detects the degree of increase ΔP in the internal pressure of the fuel tank 1 a plurality of times, and this improves the diagnostic accuracy.

Further, since the operating range B includes the lower load range and/or the lower engine speed range than the operating range A, it is possible to easily set the optimum operating ranges of the first failure diagnostic device 13 and the second failure diagnostic device 14. Further, since the operating range B includes the entire operating range A, it is not only determined whether there is any leakage from a large hole. Therefore, it is never determined that the evaporated fuel purge system is normally operating even though there is leakage from a small hole, and this ensures the reliability of the failure diagnosis.

What is claimed is:

1. A failure diagnostic system of an evaporated fuel processing system, comprising:

a first failure diagnostic device for shutting off an evaporated fuel purge passage connecting a fuel tank and an engine intake passage from air in a first operating range and determining whether there is any leakage from a large hole by monitoring a degree of increase in pressure in the fuel tank in which intake negative pressure is introduced; and a second failure diagnostic device for reducing a pressure in the fuel tank to a predetermined negative pressure and sealing off the fuel tank from air in a second operating range to carry out failure diagnosis to determine whether there is any leakage from a small hole by monitoring a degree of increase in pressure in the fuel tank;

wherein said second operating range substantially includes said first operating range and is extended from said first operating range to include a lower intake negative pressure range.

2. A failure diagnostic system of an evaporated fuel processing system according to claim 1, further comprising:

an engine speed detecting device for detecting an engine speed; and an engine load detecting device for detecting an engine load;

wherein said first operating range and said second operating range are set respectively according to the engine speed and the engine load, such that said second operating range includes a lower engine speed range and a lower engine load range than said first operating range.

3. A failure diagnostic system of an evaporated fuel processing system according to claim 1, wherein said second failure diagnostic device starts carrying out failure diagnosis after said first failure diagnostic device carries out failure diagnosis in a common operating range.

4. A failure diagnostic system of an evaporated fuel processing system according to claim 1, wherein if the degree of decrease in pressure is smaller than a determination value, said first failure diagnostic device determines that the evaporated fuel processing system has failed and indicates an alarm.

5. A failure diagnostic system of an evaporated fuel processing system according to claim 1, wherein if the degree of increase in pressure is greater than a determination value, said second failure diagnostic device determines that the evaporated fuel processing system has failed and indicates an alarm.

6. A failure diagnosis system of an evaporated fuel processing system according to claim 1, wherein said second failure diagnostic device repeats the process of reducing the pressure in the fuel tank to the predetermined negative pressure and sealing off the fuel tank from air, if the degree of increase in pressure is greater than a determination value in a first process.

7. A failure diagnosis system of an evaporated fuel processing system according to claim 6, wherein said second diagnostic device determines that the evaporated fuel process system has failed when a number of times the degree of increase becomes greater than the determination value exceeds a predetermined number.

* * * * *